(12) United States Patent
Clark et al.

(10) Patent No.: US 11,889,815 B2
(45) Date of Patent: Feb. 6, 2024

(54) ELECTRONIC LATCHING DEVICE

(71) Applicant: Jesse W. Clark, Bryant, AR (US)

(72) Inventors: Jesse W. Clark, Bryant, AR (US); David G. Albers, Jr., Alma, AR (US)

(73) Assignee: Jesse W. Clark, Bryant, AR (US)

( * ) Notice: Subject to any disclaimer, the term of this patent is extended or adjusted under 35 U.S.C. 154(b) by 961 days.

(21) Appl. No.: 16/241,190

(22) Filed: Jan. 7, 2019

(65) Prior Publication Data
US 2019/0133085 A1  May 9, 2019

Related U.S. Application Data

(63) Continuation-in-part of application No. 15/083,880, filed on Mar. 29, 2016, now abandoned.
(Continued)

(51) Int. Cl.
E05B 47/00 (2006.01)
A01K 27/00 (2006.01)
(Continued)

(52) U.S. Cl.
CPC ............. A01K 27/005 (2013.01); A01K 1/04 (2013.01); A01K 15/003 (2013.01); A01K 27/003 (2013.01); E05B 47/0004 (2013.01)

(58) Field of Classification Search
CPC .. E05B 47/00; E05B 47/0001; E05B 47/0002; E05B 47/0003; E05B 47/0004; E05B 47/02; E05B 47/023; E05B 47/06; E05B 47/0603; E05B 2047/0014; E05B 2047/0015; E05B 2047/0016; E05B 2047/0036; E05B 2047/0094; E05B 57/00; E05B 65/0007; E05B 67/00; E05B 67/06; E05B 67/08; E05B 67/10; E05B 67/28; E05B 69/00; E05B 69/003; E05B 69/006; E05B 69/02; E05B 71/00; E05B 73/00; E05B 73/0094; E05B 73/02; E05B 75/00; Y10T 292/1021; Y10T 292/1082; Y10T 292/20; Y10T 292/228; Y10T 292/45; Y10T 292/513; Y10T 292/522;
(Continued)

(56) References Cited

U.S. PATENT DOCUMENTS 3,134,154 A * 5/1964 Smith ................ E05B 47/0002
114/230.26
3,504,406 A * 4/1970 Marcel .................... E05B 65/00
294/82.26
(Continued)

Primary Examiner — Christine M Mills
Assistant Examiner — Noah Horowitz
(74) Attorney, Agent, or Firm — Ted M. Anthony

(57) ABSTRACT

An electronic latching device having a solenoid, latch, locking piece, and a pivot arm. One end of the pivot arm is connected to the solenoid actuator and the other end is connected to the locking piece. Upon electronic activation, the solenoid actuator moves in a lateral direction, which causes the end of the pivot arm connected to the actuator to move in the same direction. This movement causes the pivot arm to pivot about the pivot point, resulting in the movement of the opposite end of the pivot arm to move in a second and opposite direction. This movement of the second end of the pivot arm in the second direction causes the locking piece to move in the same second direction, unlocking the device and allowing for the latch to freely move to an open position.

11 Claims, 9 Drawing Sheets

Related U.S. Application Data

(60) Provisional application No. 62/178,082, filed on Mar. 30, 2015.

(51) Int. Cl.
*A01K 1/04* (2006.01)
*A01K 15/00* (2006.01)

(58) Field of Classification Search
CPC .............. Y10T 292/68; Y10T 292/696; Y10T 292/699; Y10T 292/702; Y10S 292/25
See application file for complete search history.

(56) References Cited

U.S. PATENT DOCUMENTS

| | | | | |
|---|---|---|---|---|
| 4,353,151 | A * | 10/1982 | Ennerdal | A44B 11/2523 24/641 |
| 4,562,625 | A * | 1/1986 | Doty | A44B 11/2523 24/690 |
| 5,771,668 | A * | 6/1998 | Younger | B68C 1/00 54/1 |
| 5,815,895 | A * | 10/1998 | Carlson | A44B 11/25 24/641 |
| 6,578,885 | B1 * | 6/2003 | Tillman | A01K 15/003 292/201 |
| 8,196,377 | B1 * | 6/2012 | Putty | B68C 1/00 54/69 |
| 8,601,983 | B2 * | 12/2013 | Flynn | A01K 1/04 119/769 |
| 2012/0240867 | A1 * | 9/2012 | Flynn | A01K 1/04 119/721 |
| 2012/0247397 | A1 * | 10/2012 | Lvovskiy | A01K 15/021 119/859 |
| 2017/0030109 | A1 * | 2/2017 | Duncan | E05B 47/0009 |

* cited by examiner

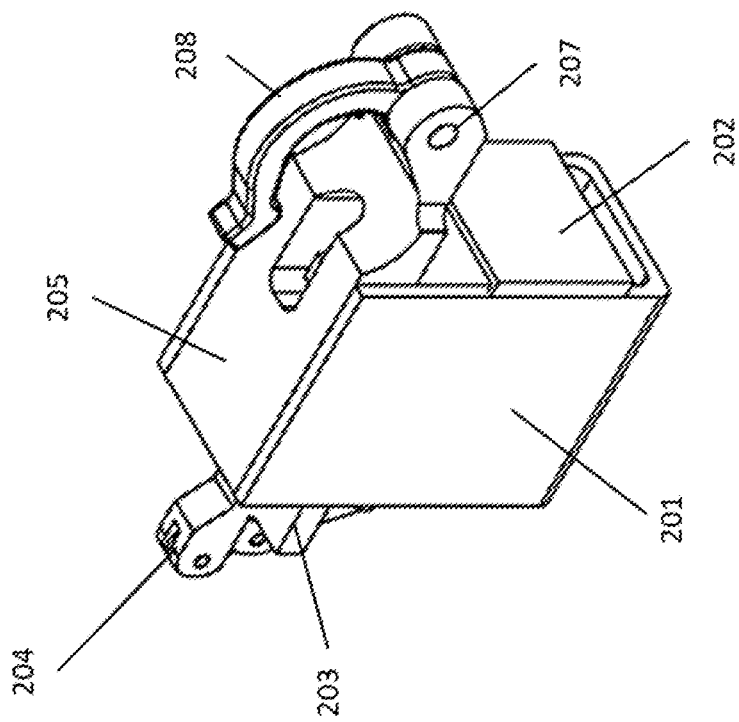
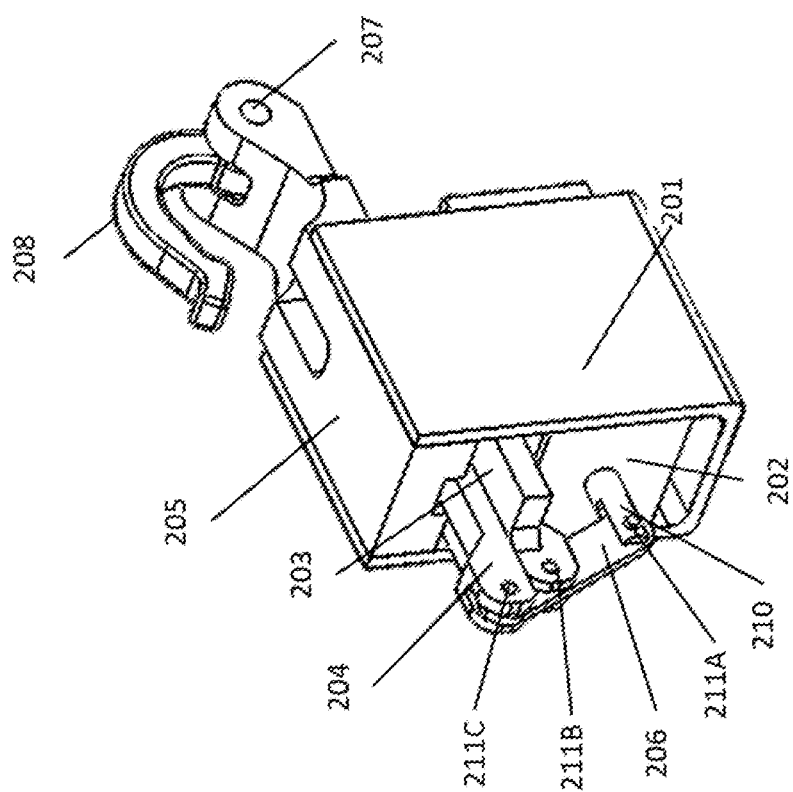
FIG. 5B
FIG. 5A

ELECTRONIC LATCHING DEVICE

CROSS-REFERENCE TO RELATED APPLICATIONS

This application is a continuation-in-part application of, and claims the benefit of, U.S. patent application Ser. No. 15/083,880, filed on Mar. 29, 2016, and entitled "Remote Controlled Animal Restraining Device," which claims the benefit of U.S. Provisional Patent Application No. 62/178,082, filed on Mar. 30, 2015, and entitled "E-Leash—Remote Controlled Electronic Quick-Release Leash." Such applications are incorporated herein by reference in their entirety.

STATEMENT REGARDING FEDERALLY SPONSORED RESEARCH OR DEVELOPMENT

None

BACKGROUND OF THE INVENTION

Hunting is a widely enjoyed pastime in the United States, with nearly 14 million people partaking in hunting annually. Migratory bird hunting accounts for about 19 percent of those 14 million hunters (or 2.6 million hunters annually), with duck hunting, in particular, accounting for 1.4 million hunters. A large number of hunters, particular those partaking in duck hunting, use hunting dogs to retrieve downed birds. These dogs are trained to stay in the duck blind until the hunter commands it to retrieve the downed birds. However, many hunting dogs, no matter how well trained, leave the blind looking for birds before the hunters command, which is dangerous for the dog, as guns are still being fired.

To solve this problem, hunters have developed techniques to keep the dog in the blind until the right time. For example, some hunters stand on the dog leash, preventing the dog from taking off before the hunter wishes. When the hunter is ready for the dog to retrieve birds, the hunter takes his legs off the lease and commands the dog to retrieve. Other hunters may wrap a dog leash around a tree and hook the dog to the leash. Although the dog is unable to release early, the problem with this technique is that the hunter must physically unhook the dog each time the dog is commanded to retrieve. This technique could also be potentially dangerous for the dog, as if the dog were to fall from the stand (which is often suspended above the ground) the dog would potentially be hung by the leash until the hunter as able to unhook the dog. The present invention is aimed at solving the inefficiencies of these techniques while still accomplishing the goal of having the dog secured until the hunter's command. Use of the hunting application is intended to be exemplary only and is not intended to limit the present invention as the present invention can be used in any application for which it is desirable to train a dog to learn to stay at a spot until they are given a command, such as police or military use.

BRIEF SUMMARY OF THE INVENTION

The present invention relates generally to a latching device operable to securely fasten a functional piece when the latch is in a closed position and to release the functional piece when the latch is in the open position. One exemplary use for such device is for securing a dog or other animal to a fixed point, particularly in hunting situations. An object of the present invention is to provide hunters with a safe and efficient means for securing their hunting dog to a tree, blind, or other immovable structure such that the dog remains in position until the hunter releases the dog and commands the dog to retrieve downed birds. It is understood that, although the preferred embodiment of the present invention is employed in hunting, the present invention can be used in any application in which it is desirable to secure a dog or other animal to a fixed point for a period of time prior to release. Furthermore, the device can be used in an application for which it is desirable to train a dog to learn to stay at a spot until they are given the command to break. For example, a police officer may use the device to release his K-9 officer from his police vehicle without requiring the officer to take his attention off of the perpetrator. Alternatively, a physically disabled dog owner can use the device to restrain their dog while doing a task in which the dog may get in the way (i.e. shutting a gate or door) and can release the dog remotely when the task is complete. Use of the hunting application is intended to be exemplary only and is not intended to limit the present invention to such application. Likewise, use for securing animals to a fixed point is only exemplary and the present invention is useful for other scenarios where a latching device is required.

These and other features, objects and advantages of the disclosed subject matter will become better understood from a consideration of the following detailed description, drawings, and claims directed to the invention. This brief summary and the following detailed description and drawings are exemplary only, and are intended to provide further explanation of various implementations without limiting the scope of the invention as set forth in the claims.

BRIEF DESCRIPTION OF THE DRAWINGS

FIGS. 5A and 5B are perspective views of the second embodiment of the latching device of the present invention with the latch in the open unlocked position

DETAILED DESCRIPTION OF THE INVENTION

The present invention relates generally to a latching device, which may be useful, for example, for securing an animal to a fixed structure. As mentioned above, while the device may be described herein with respect to use with a dog, the invention is not so limited and such illustration is provided for exemplary purposes only. Furthermore, while the device may be described with respect to the restraint of an animal, the device is, again, not so limited, and the device may be used in any other situation where the user desires to restrain an object. In general, the present invention is directed to an electronically operated latching device allowing for a remote activation of the device by a user, the activation of the device providing for a release of the restrained animal from the device through the mechanical release of a leash attachment piece from a leash securing component of the latching device. Thus, while alternative embodiments are described herein, the intended use of the device is to remotely activate the electronic latching device attached to a fixed structure to mechanically release the leash attachment piece of a leash from the leash securing component of the device. Such use is shown, for example, with regard to one embodiment in FIG. 8B, but it is understood that the method of use remains the same for all various embodiments of the device. Furthermore, it should be noted that while the drawings show the device in a position where the latch is positioned upward, the device could easily be flipped such that the latch is positioned downward when in use.

Figure 1:
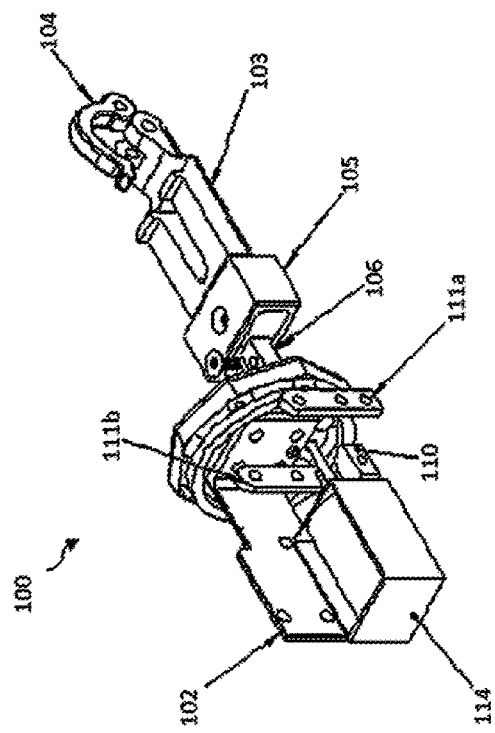
FIG. 1 is a perspective view of a first embodiment of the latching device of the present invention.
Figure 2:
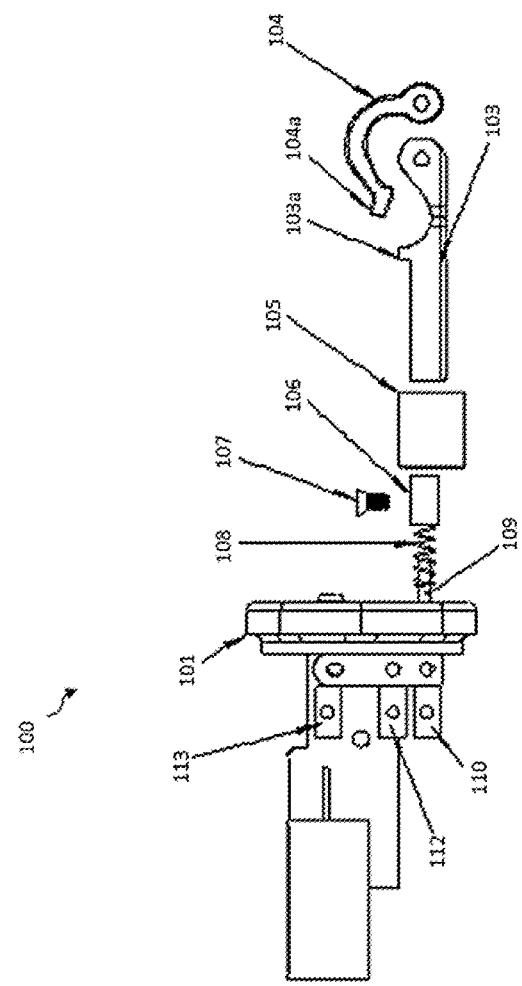
FIG. 2 is an exploded side view of the first embodiment of the latching device of the present invention.

With reference to FIGS. 1-2, a first embodiment of the remote controlled electronic latching device may be described. The first embodiment of the device utilizes a linear solenoid 114, which is a device that converts an electrical signal into a magnetic field producing a linear motion, as known in the art. The solenoid comprises an electrical coil wound around a cylindrical tube with an actuator or plunger positioned inside the coil that is configured to slide in and out of the coil's body. When an electrical current is passed through the coil a magnetic field is produced and the actuator located inside the coil is attracted to the center of the coil, thereby compressing a spring component of the solenoid. This is referred to as the actuator being in the "in position." When the electrical current supplied to the solenoid is disrupted, the magnetic field is removed. Because there is no longer a magnetic force applied to the actuator, the energy stored in the compressed spring forces the actuator back into its original rest position. This is referred to as the actuator being in the "rest position." When the electrical current is again supplied to the solenoid, the actuator returns to the in position. As can be seen, through the use of electrical force, linear motion of the actuator can be obtained as the actuator moves between the in position and rest position as electrical force is applied and unapplied.

In light of the general description of solenoid operation above and with reference to FIGS. 1-2, the first embodiment 100 of the latching device of the present invention may be described. Generally speaking, the device may be described as having a solenoid end and a latch end, with the latch end being used to securely restrain the leash worn by the restrained animal, as described more fully below. In the drawings shown, the solenoid end is positioned on the left side of the drawings and the latch end is positioned on the right side of the drawings. The components located on the solenoid end of the device are connected to each other and to the components located on the latch end of the device such that, as described below, when an electrical signal is provided to a solenoid 114 located at the solenoid end, the components work/move in a particular manner to release a latch 104 located at the latch end. This releases the restrained animal from the device and therefore allows the restrained animal to depart from the fixed structure to which the animal has been restrained.

As shown in FIG. 2, the first embodiment comprises a cap 101 located between the solenoid end and the latch end of the device 100. The cap 101 rigidly connects a solenoid mounting bracket 102 located on the solenoid end of the device to a pull snap body 103 located on the latch end of the device. The solenoid 114 is rigidly connected to the solenoid mounting bracket 102. As described above, the solenoid 114 includes an actuator (plunger) and a coil. The actuator is positioned on the device such that, when in the rest position, the actuator extends out of the solenoid end of the device. An electrical power source is connected to the solenoid 114 such that, upon receiving an electrical signal from a remote control, the solenoid 114 is energized and the actuator moves into the solenoid and toward the latch end of the device (or the "in position"). The power source may be a battery or other electrical source. The cap 101 is configured to attach to a protective housing (not shown) such that the solenoid end of the device is enclosed in the housing. The housing is preferably cylindrical, but the shape of the housing and of the cap 101 may be modified as desired.

A mounting piece 113 connects the actuator of solenoid 114 to one or more pivot arms 111a, 111b, preferably by one or more bolts. The mounting piece 113 is connected to a first end of the pivot arms 111a, 111b, as shown in FIG. 2. In addition to being connected to the solenoid actuator through the mounting piece 113, the pivot arms 111a, 111b are also connected by bolts to the pivot block 112 and a mounting piece 110. As shown, mounting piece 110 is connected to pivot arms 111a, 111b at the opposite end as mounting piece 113. Pivot block 112 is rigidly mounted to mounting bracket 102 such that pivot block 112 is immovable, which allows for the pivoting of the pivot arms 111a, 111b.

Pivot block 112 is connected to the pivot arms 111a, 111b at a point between the connection of the pivot arms 111a, 111b with mounting piece 110 and the other mounting piece 113. The pivot arms 111a, 111b, are rotatably connected to the pivot block 112 at this connection point, such that the pivot arms 111a, 111b are configured to pivot about the pivot block 112 connection point Because the actuator is attached to mounting piece 113 (which is connected to one end of the pivot arms 111a, 111b), when the actuator moves toward the latch end of the device 100, mounting piece 113 is also forced to move toward the latch end of the device. Because mounting piece 113 is connected to the top end of the pivot arms 111a, 111b, as the mounting piece 113 is forced to move toward the latch end of the device, the top end of pivot arms 111a, 111b is forced in the same direction. As the top end of the pivot arms 111a, 111b is forced toward the latch end of the device, the pivot arms rotate about pivot block 112 such that the bottom end of the pivot arms 111a, 111b move toward the solenoid end of the device. As the bottoms of pivot arms 111a, 111b move toward the solenoid end of the device, the mounting piece 110 (which is attached to the bottom end of the pivot arms 111a, 111b) also moves toward the solenoid end of the device.

As noted above, the latch end of the device includes a pull snap body 103, which is connected to the solenoid mounting bracket 102 through the cap 101. The pull snap body 103 is further connected on its opposite end to the latch 104. The latch 104 is pivotally connected to the pull snap body 103 so that the latch may rotate between an open position and a closed position. The rotatable connection may be facilitated through a pin inserted through both an aperture in the latch 104 and in the end of the pull snap body 103, allowing the latch 104 to rotate freely. When the latch 104 is in the closed position, the lip 104a on the latch 104 is positioned over a lip 103a on the pull snap body 103 such that the latch lip 104a is on the solenoid end side of the pull body lip 103a.

A sliding lock piece 105 is slidably mounted to the pull snap body 103. The sliding lock piece 105 is configured to move in a lateral direction toward and away from the pull body lip 103a. The sliding lock piece 105 slides toward the pull body lip 103a such that the locking piece 105 covers the latch lip 104a in a manner that the latch lip 104a is unable to rotate to the open position. When this occurs, the latch is in the closed position. The sliding lock piece 105 slides away from the pull body lip 103a in response to movement of the solenoid actuator, uncovering the latch lip 104a and allowing the latch to freely open. The sliding lock piece 105 may be spring loaded by a spring 108, which facilitates movement of the sliding lock piece 105 toward the lip 103a of the pull snap body 103 to secure the latch lip 104a in place in the closed position. Movement of the sliding lock piece 105 away from the pull body lip 103a in response to activation of the solenoid results from the movement of the pivot arms 111a, 111b and mounting piece 110 described above.

The mounting piece 110 is not only connected to the bottom end of the pivot arms 111a, 111b but is also connected to a pull arm 109. Pull arm 109 is also connected at its opposite end to mounting piece 106, which connects the pull arm 109 to the sliding lock piece 105. The mounting piece 106 is preferably connected to the sliding lock piece 105 by a bolt 107. As the pivot arms 111a, 111b rotate, thereby causing mounting piece 110 to move toward the solenoid end of the device, pull arm 109 moves with mounted piece 110 toward the solenoid end of the device. Because the mounting piece 106 is connected to the slidable lock piece 105, the slidable lock piece 105 is also forced to move toward the left end of the device, thereby compressing a spring 108. As the slidable lock piece 105 moves away from the lip 103a of the pull snap body 103, the slidable lock piece 105 no longer covers the lip 104a of the latch 104. Thus, the latch 104 is able to rotate away from the pull snap body and into an open position. After the solenoid 114 is de-energized and the actuator moves back into the rest position, the device can be reset for securing the latch 104 another time, with the spring 108 decompressing and forcing the sliding lock piece 105 back to the lip 103a of the pull snap body for locking of the latch 104 in place. This process may be repeated many times, allowing for the restraint and release of the animal for many uses.

Figure 6A:
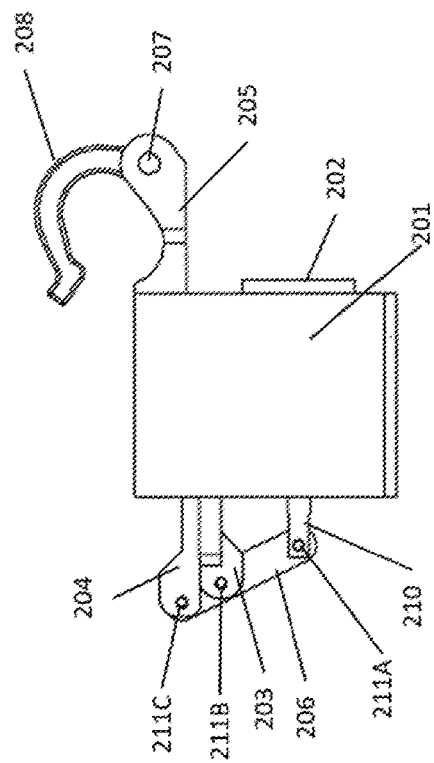
FIG. 6A is a side view of the second embodiment of the latching device of the present invention with the latch in the closed locked position.
Figure 6B:
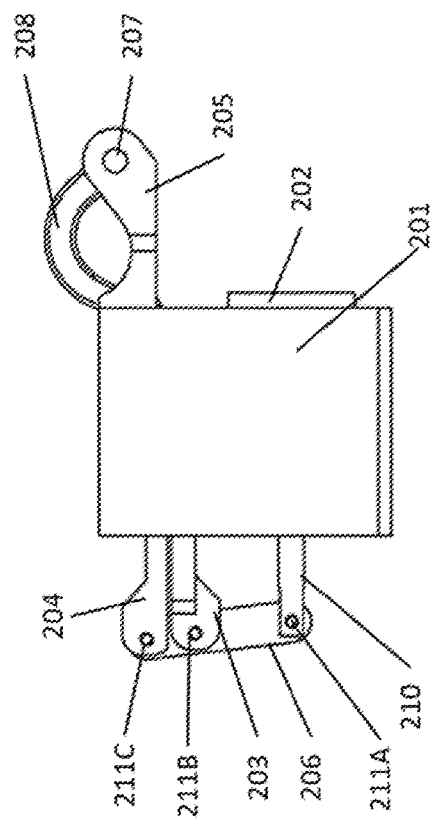
FIG. 6B is a side view of the second embodiment of the latching device of the present invention with the latch in the open unlocked position.

In an alternate embodiment, as shown in FIGS. 3-6B, the device 200 may be structured such that the solenoid 202 is positioned on the same end of the device 200 as the latch 208. For example, the solenoid 202 is positioned inside the housing 201 underneath the latching mechanism components (as shown underneath pull snap body 205 on the same end as latch 208). The solenoid 202 still includes an actuator 210 with a rest position (FIGS. 4A, 4B and 6A) and an in position (or retracted position) (FIGS. 5A, 5B, and 6B). Because the solenoid 202 and latch 208 are positioned on the same end of this particular embodiment, the terms "solenoid end" and "latch end" cannot be used to describe this embodiment. Instead, the terms "latch end" (referring to the end with both the latch 208 and solenoid 201) and "non-latch end" (referring to the opposite end of the device with components 203, 204) may be used. Thus, as shown, the solenoid actuator 210 is configured to rest in its rest position such that it is extended outward from the solenoid 201 toward the non-latch end of the device as shown in FIG. 6A. As the device is activated and the solenoid 202 is electrically charged, the actuator 210 moves toward the latch end of the device into the solenoid 202 (i.e. the "in position") as shown in FIG. 6B.

While the device in this embodiment operates in a similar manner as the previously described embodiment (that is, the actuator 210 moves in response to activation of the solenoid 202 of the device resulting in a series of movements that ultimately allows release of the latch 208), the structure varies slightly to allow for a lower profile device 200. For example, as described above, the solenoid 202 is moved to the same end of the device 200 as the latch 208, reducing the linear profile of the device 200. Like the previously described embodiment, as the solenoid 202 is charged, movement of the actuator 210 results in a pivoting motion, which ultimately allows for release of the latch 208. In this particular embodiment, however, because the solenoid 202 is located at the same end of the device as the latch 208, slight modifications to the pivoting components must be made. In particular, this embodiment includes a pivot arm 206 with three connection points 211A, 211B, and 211C (as shown in FIGS. 4A, 5A, and 6A-6B). The pivot arm 206 is connected at connection point 211A to the actuator 210 of the solenoid 210, as shown. At its opposite end, the pivot arm 206 is connected to a pull arm 204 at connection point 211C. Connection point 211B falls at a point between connection point 211A and 211C. It is preferred that the distance between connection points 211A and 211B (which may be referred to as "length AB") is longer than the length between connection points 211B and 211C ("length BC") which increases the force generated by the solenoid 202 when transferred to the pivot arm 206. More preferably, the length AB should be about 50 to 100% longer than length BC to reduce the load on the solenoid 202.

Figure 3:
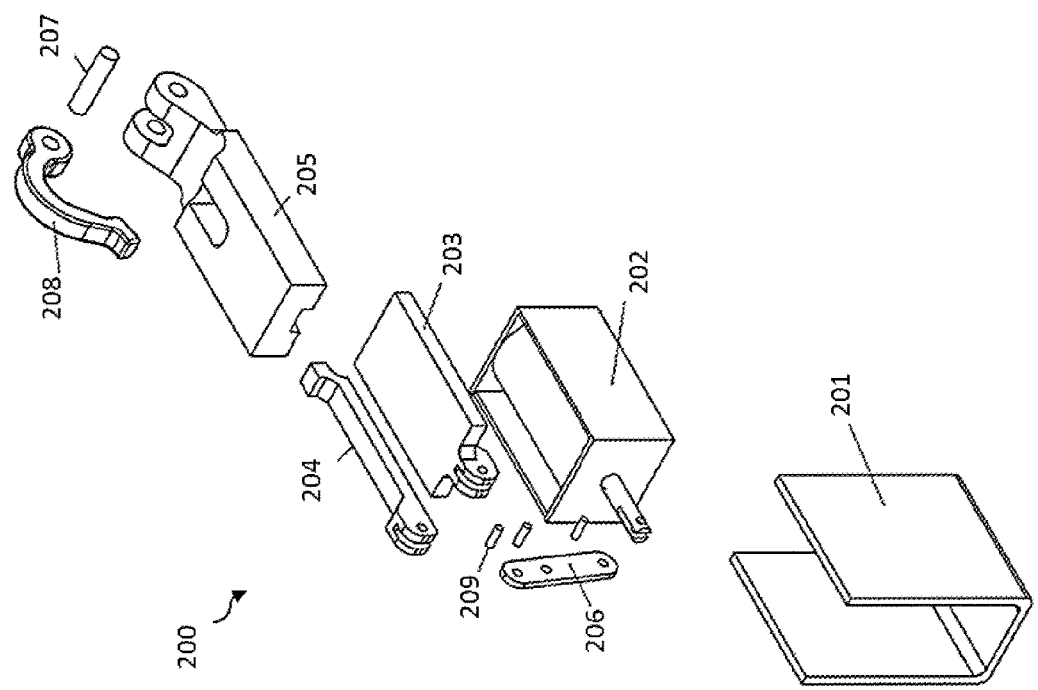
FIG. 3 is an exploded view of a second embodiment of the latching device of the present invention.
Figure 4B:
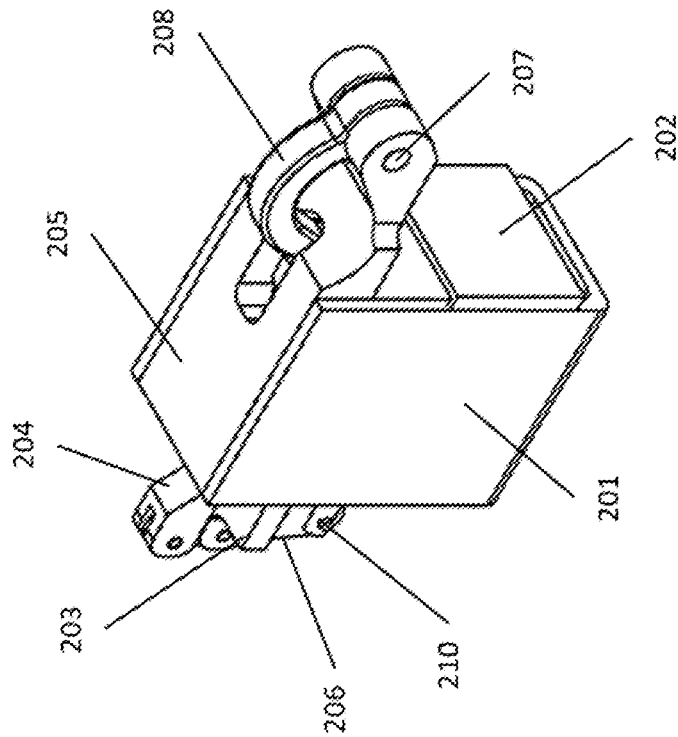
FIGS. 4A and 4B are perspective views of the second embodiment of the latching device of the present invention with the latch in the closed locked position.
Figure 4A:
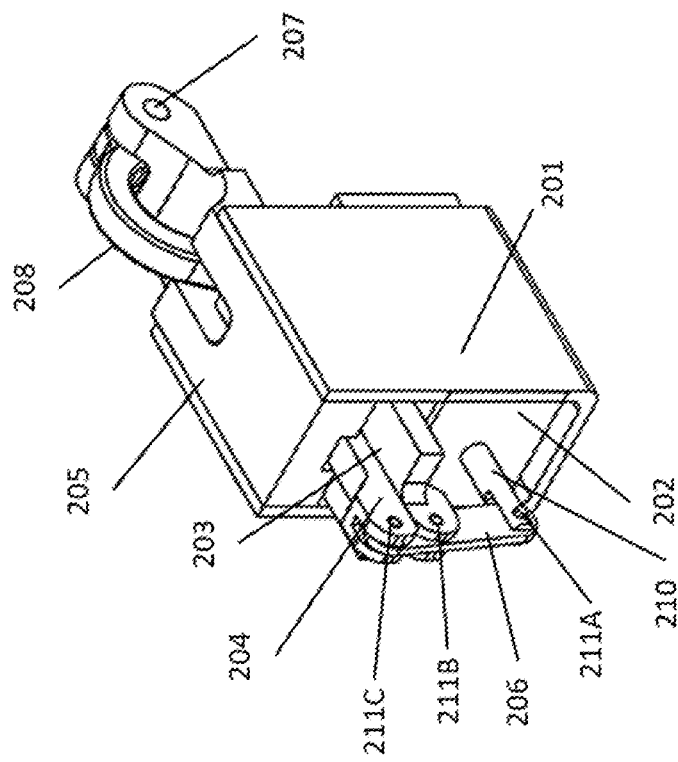
Figure 6C:
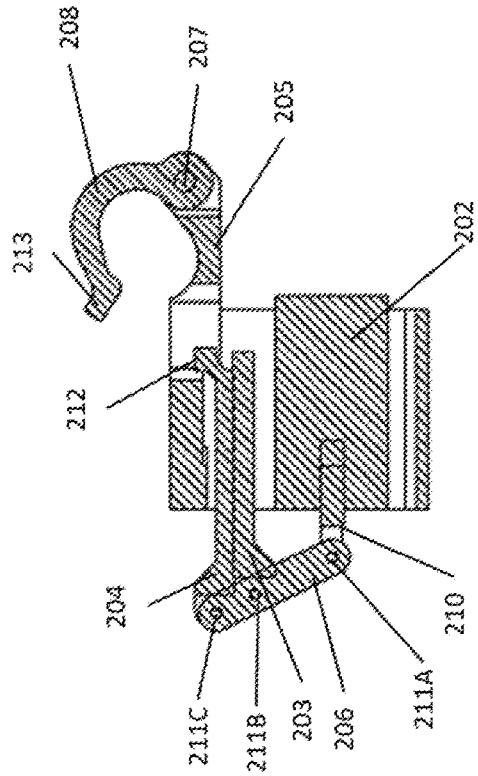
FIG. 6C is a sectional view of the second embodiment of the latching device of the present invention with the latch in the closed locked position.
Figure 6D:
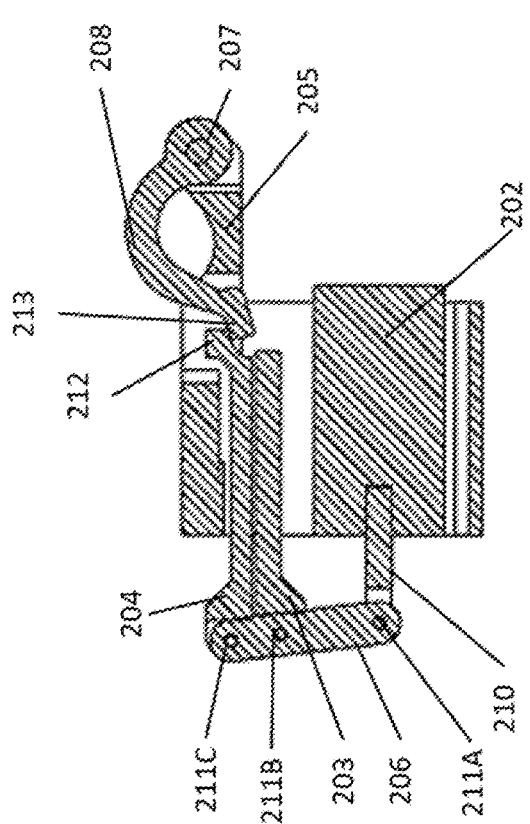
FIG. 6D is a sectional view of the second embodiment of the latching device of the present invention with the latch in the open unlocked position.
Figure 7:
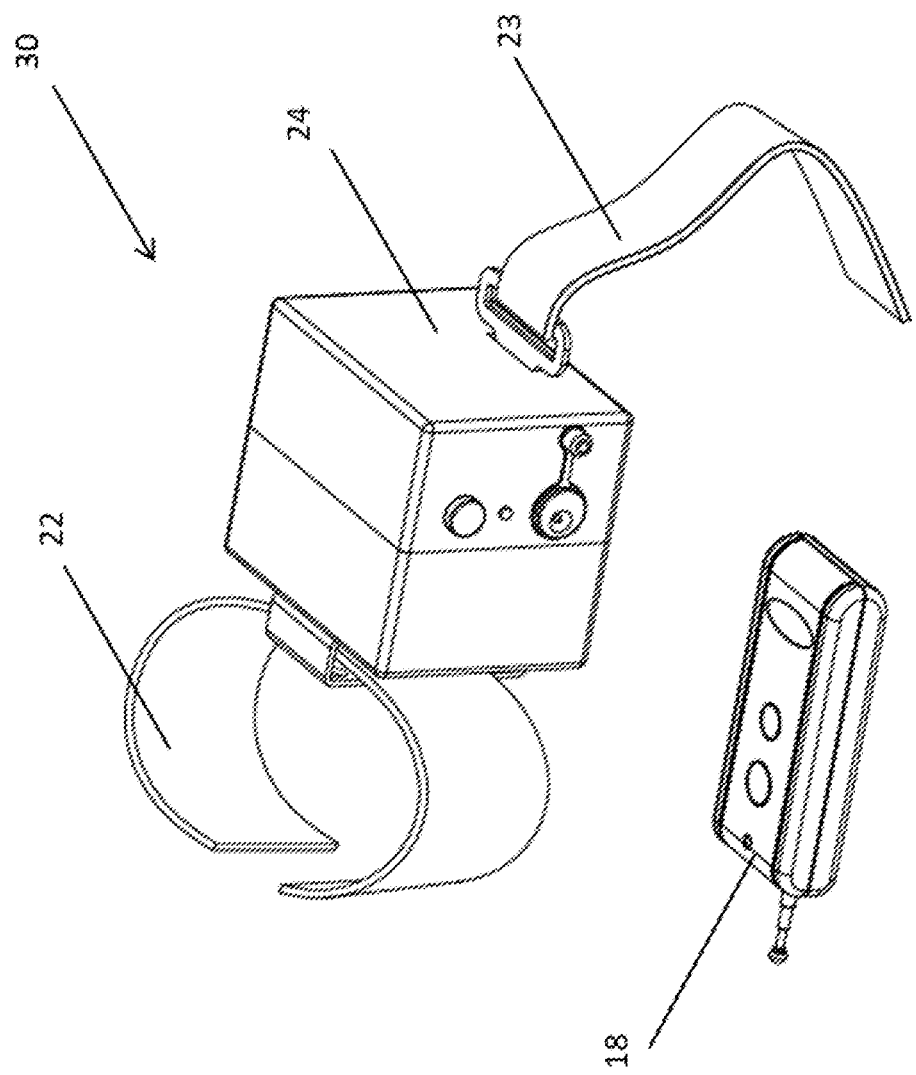
FIG. 7 is a perspective view of a third embodiment of the latching device and remote control of the present invention.

At connection point 211B, the pivot arm 206 is rotatably connected to a pivot block 203 such that the pivot arm 206 is capable of pivoting about the pivot block 203, similar to the manner described above with the first embodiment. The pivot block 203 preferably is rigidly connected to housing 201 such that pivot block 203 does not move during operation of the device. As the actuator 210 of the solenoid 202 moves to its "in position" inside the solenoid 202 and toward the latch end of the device 200 due to the linear motion generated by the electrical current flow through the solenoid 202, the end of the pivot arm 206 connected to the actuator 201 at connection point 211A moves in the same direction as it is pulled by the moving actuator 210 (as shown in FIG. 6B). Because the pivot arm 206 is rotatably attached to a pivot block 203 at connection point 211B (which is rigidly mounted to the device housing 201 such that it is immovable, allowing for pivoting at connection point 211B), as the first end of the pivot arm 206 moves in response to the pull of the actuator 210, the opposite end (which is positioned on the opposite side of connection point 211B), moves in an opposite direction. For example, as shown in comparing FIGS. 6A and 6B, as the bottom of the pivot arm 206 moves right in response to the pull of the actuator 210, the top of the pivot arm 206 moves left as the pivot arm 206 pivots about connection point 211B. Because the second end of pivot arm 206 is connected to the pull arm 204 at connection point 211C, the pull arm 204 moves in the same direction (e.g. left—away from the latch end). This movement away from the latch end of the device, like with the previously described embodiment, allows the latch 208 to freely rotate and release from the device 200. In particular, as shown in FIGS. 6C-6D the pull arm 204 includes a lip 212 positioned on its end near the latch end of the device. When the latch 208 is in the closed, locked position (as shown in FIG. 6C), a protrusion 213 on the latch 208 is covered by the lip 212 of the pull arm 204 such that the latch 208 cannot open. When the pivot arm 206 rotates (thus pulling pull arm 204 away from the latch end of the device), the lip 212 no longer covers the latch protrusion 213 and the latch 208 can freely rotate to an open, unlocked position (as shown in FIG. 6D). An opening in the latch body 205 of the device allows the latch 208 to pass from the closed, locked position to the open, unlocked position. To rotatably secure the latch 208 to the latch body 205, a fastener 207 may be used, as shown in FIG. 3. Similar fasteners 209 are also used to rotatably secure the lever arm 206 to its connected components 204, 203, and 210 at connection points 211C, 211B, and 211A, respectively.

When used to restrain an animal, a ring or other attachment piece of the leash used to secure the animal is positioned such that the latch 104 extends through the attachment piece of the leash. Thus, when the latch 104 is in the closed position, the attachment piece of the leash is captured between the latch 104 and the pull snap body 103 and the animal is unable to release from the fixed structure to which the latching device 100 is secured. When the latch 104 is moved into the open position after electrical signal from the remote is received, however, the leash attachment piece is able to freely move from the open latch 104 and the animal is no longer restrained.

Turning to FIGS. 7-10C, a third embodiment 30 of the latching device of the present invention may be described. Turning to FIG. 8B, the operation of the preferred embodiment of the present invention can be described generally. A tethering strap 22 of the latching device 30 is removably attached to a tree or other stationary structure 29. The strap 22 is attached to the shell or housing 24, which contains the internal components of the device. A leash 23 is attached to a collar 25 worn by the dog. For example, the leash 23 and the collar 25 may be woven together or join in any other way that would be well-known to those skilled in the art. The leash 23 attached to the dog can be ejected from the shell 24 attached to the tree 29 by the push of a button 28 on the wireless remote 18. This action frees the dog from the stationary structure 29, allowing the dog to retrieve the downed birds or carry out any other desired task.

Figure 8A:
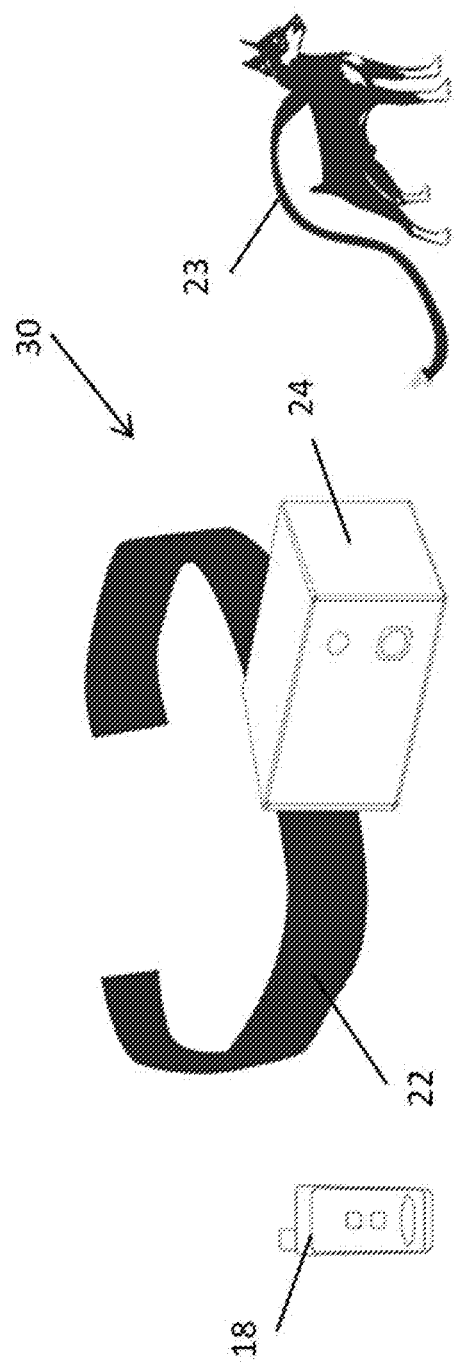
FIG. 8A is a perspective view of the third embodiment of the latching device and remote control of the present invention and a dog with a leash for purposes of showing one intended use of the latching device of the present invention.
Figure 8B:
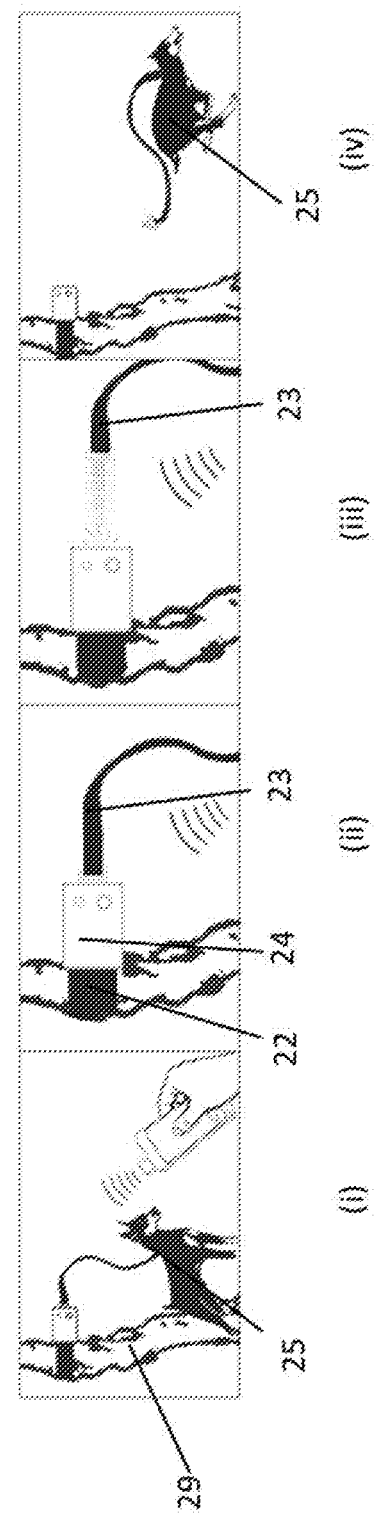
FIG. 8B is a schematic illustrating the step-by-step process (steps i, ii iii, and iv) of one method of use of the latching device of the present invention.
Figure 9:
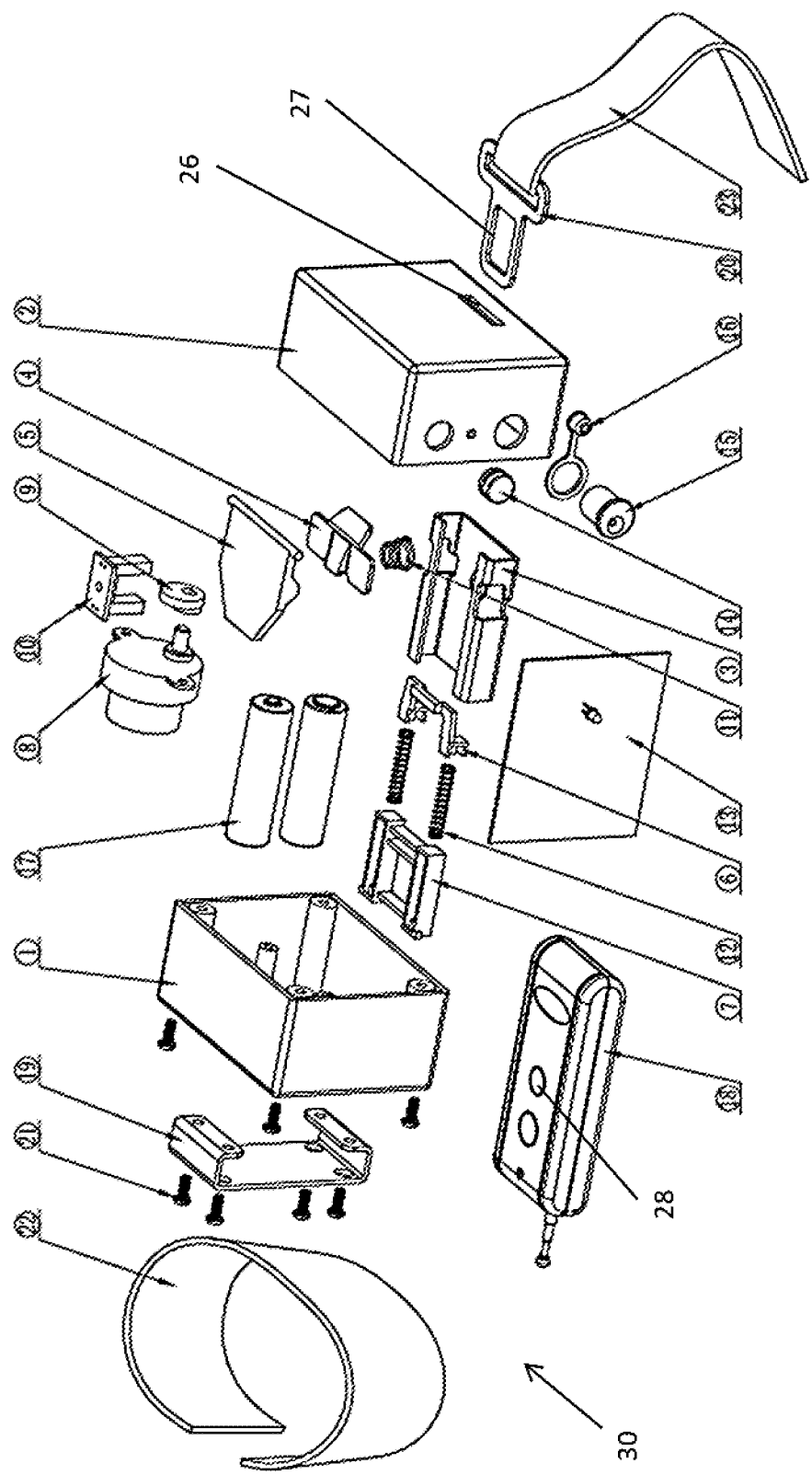
FIG. 9 is an exploded view of the third embodiment of the latching device of the present invention.
Figure 10A:
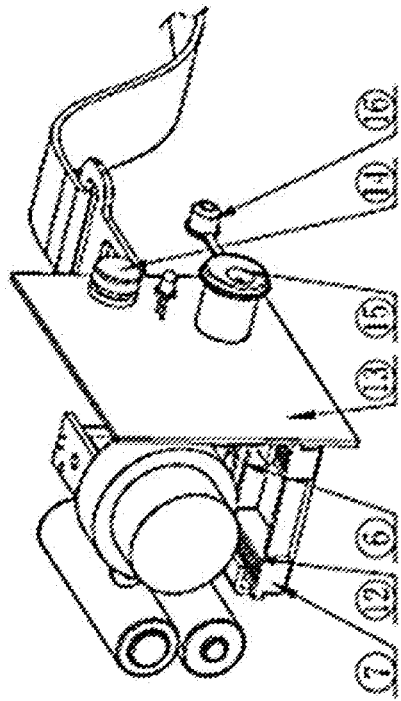
FIG. 10A is a perspective view of the locking and release system and power system of the third embodiment of the present invention.
Figure 10B:
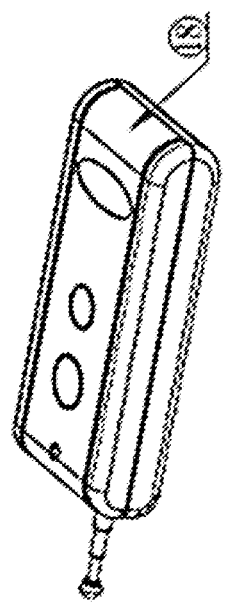
FIG. 10B is a perspective view of the locking and release system and power system of the third embodiment of the present invention.
Figure 10C:
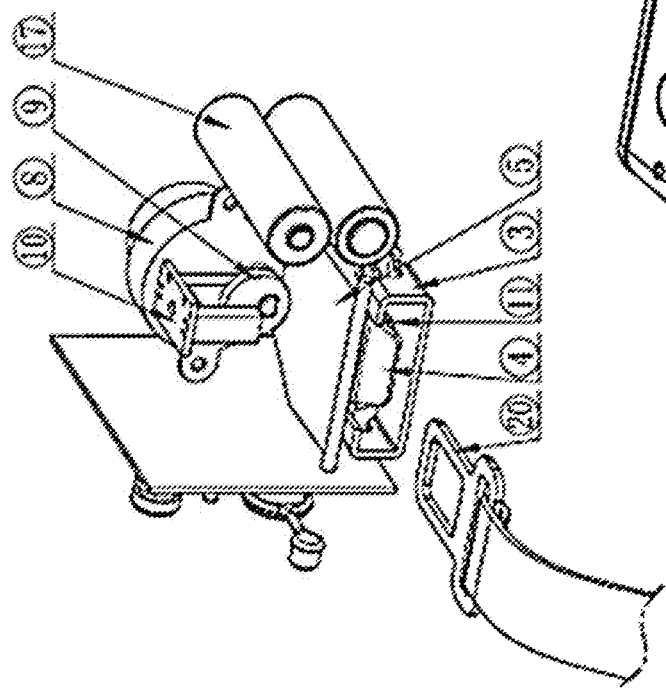
FIG. 10C is a perspective view of the remote control of the third embodiment of the present invention.

Now, turning to FIGS. 9 and 10A-10B, a third embodiment of the latching device of the present invention can be described in detail. The latching device 30 includes a body shell 24 that houses the locking and release system and the power system described below. The body shell 24 comprises two pieces 1, 2 that are attached by fasteners 21, such as screws, to form a hollow housing in which the constituent components are enclosed. One body piece 1 is attached to the tethering strap 22, which removably attaches the latching device to a fixed point 29, such as a tree. For example, the tethering strap 22 may be a ratchet strap that can be placed around a fixed structure and the slack in the strap 22 removed. However, it should be understood that the tethering strap 22 may be any type of rope or webbing suitable to secure the device in the place that would be well-known to those skilled in the art. In the preferred embodiment, a metal bracket 19 is used to attach the body piece 1 to the tethering strap 22. Fasteners 21 such as screws may be used to securely attach the metal bracket 19 to the housing 1, as shown in FIG. 9. The tethering strap 22 may be wrapped around the recessed portion of the metal bracket 19, which in turn is attached to the housing 1 via fasteners 21. The other body piece 2 has a slot opening 26 configured to receive a removable buckle 20 attached to one end of a dog leash 23. While not shown with regard to the first and second embodiments in FIGS. 1-6B, a similar tethering strap system may be utilized with the previously described embodiments to secure the device 100 to a secure, fixed structure in the same manner as shown in FIG. 8B.

A locking and release system of the latching device 30 includes the locking system bracket 3, locking system lock 4, locking system unlock plate 5, and release spring 11, buckle ejector 6, release spring housing 7, and eject spring 12. The latching device also includes a power system that includes a motor 8, gear 9, switch 10, power control board 13, power switch 14, and batteries 17. These components work together in the functioning of the latching device 30 in a similar general manner described above with regard to the first embodiment 100, but with slight variations to the particular structure and mechanical function of the device 30, as described below.

The locking system inside the body shell 24 operates to receive and secure the removable buckle 20 once the buckle 20 inserted into the slot opening 26. The buckle 20 is attached to one end of the leash 23 while the other end of the leash attaches to the collar of the dog or other animal that the users wants to tether to a fixed structure. As shown in FIG. 9 and FIGS. 10A-10B, the release spring housing 7 fits securely into the locking system bracket 3, keeping the eject spring 12 under pressure against the buckle ejector 6 at all times. When the buckle 20 is inserted into the slot opening 26 in the body shell, the buckle 20 is forced to be aligned with the buckle ejector 6. This alignment is kept using the tabs on the locking system bracket 3. As the removable buckle 20 continues to slide into the device, the eject spring 12 becomes more compressed (i.e. shorter in length).

When the removable buckle 20 is inserted far enough into the locking system bracket 3, the locking system lock 4 is pushed into the opening 27 in the buckle 20. This is because the eject spring 12 is pushing on the locking system lock 4 to keep it held in position. This causes the system to be locked. When the buckle 20 is locked into the latching device 30, the animal is prohibited from moving away from the fixed point. The buckle 20 will remain locked until the device is powered on and the user presses a button 28 on the wireless remote 18, which in turn, communicates with the power system of the device 30 that results in release of the buckle from the device.

The buckle release process is driven by the power system of the latching device. Once the device is powered on by the user by pressing the on/off switch 14 on the body shell, power is provided by batteries 17 or another on board power supply source. When the button 28 on the wireless remote is pressed, a signal is generated through the remote and is received in a power control board 13 housed in the body shell 24. The gear 9 is securely attached to the end of the motor 8. When button 28 is pressed, the power system powers the motor 8 to rotate the gear 9. The removable buckle 20 cannot be removed until the locking system unlock plate 5 is pressed in the direction of the locking system bracket 3 by the gear. When the locking system unlock plate 5 has deflected far enough, it will depress the locking system lock 4, allowing the removable buckle 20 to be removed from the device. Pressure applied to the locking system unlock plate 5 will cause the removable buckle 20 to be ejected from the device due to the force exerted from the eject spring 12 pushing against the locking system lock 4.

When the switch 14 or the button 28 is released, the motor 8 will disengage power and the gear 9 will be free to rotate back to a more comfortable position, allowing the locking system unlock plate 5 to raise back to the ready position, due to the pressure exerted upon it by the release spring 11. Alternatively, if the gear 9 contacts the switch 10, the motor 8 automatically stops. At this point, the system has been "reset" allowing the whole process to be repeated. Once the dog returns, the user may reinsert the removable buckle into the latching device, which will lock the buckle 20 back into the locking assembly. The process may then be repeated as necessary.

The exterior surface of body shell includes the power on/off switch 14 and rechargeable socket 15. Because repeated use of the device may deplete the power source, a rechargeable socket 15 may be coupled to the device to allow recharging of the batteries 17 or other power supply. A rubber seal 16 is coupled to the rechargeable socket 15 to keep any moisture from reaching the internal components of the power system.

While various embodiments of the locking and release system of the present invention has been described in detail above, it should be understood that other locking and release systems that would be well-known to those skilled in the art may alternatively be used that can carry out the same function described above.

The present invention has been described with reference to the foregoing specific implementations. These implementations are intended to be exemplary only, and not limiting to the full scope of the present invention. Many variations and modifications are possible in view of the above teachings. The invention is intended to be limited only as set forth in the appended claims.

The invention claimed is:

1. An electronic latching device for selectively latching a leash ring comprising:
   a. a solenoid configured to receive an electrical signal, the solenoid comprising an actuator configured to move in a first direction in response to the receipt of the electrical signal;
   b. a pull snap member, comprising:
      i) an elongated body having a proximal end, a distal end and a length;
      ii) a clevis bracket disposed at said distal end;
      iii) a semicircular latch member having a first end and a second end, said semicircular latch member further comprising a latch lip disposed at said first end and an eyelet loop disposed at said second end; and
      iv) a pivot pin extending through said clevis bracket and said eyelet loop of said semicircular latch member, wherein said semicircular latch member is pivotally mounted to said clevis bracket, and wherein said semicircular latch member is configured to rotate about said pivot pin from a closed position wherein said semicircular latch member and said body cooperate to form a closed latch loop, to an open position wherein said first end of said semicircular latch member is separated from said body to form an opening in said latch loop;
   c. a locking piece slidably disposed on said elongated body of said pull snap and configured to move between a first position and a second position along said length of said elongated body of said pull snap;
   d. a pull arm connecting the solenoid actuator and the locking piece;
   e. a pivot arm having a first end and a second end, wherein the first end is connected to the actuator and the second end is connected to the pull arm, wherein the pivot arm is configured to pivot about a pivot point positioned between the first end and second end of the pivot arm, and wherein said locking piece contacts said latch lip of said semicircular latch member and restrains said semicircular latch member from rotating about said pivot pin when said locking piece is in said first position and said semicircular latch member is in said closed position, and wherein said locking piece is out of contact with said latch lip of said semicircular latch member when said locking piece is in said second position, and wherein the first end of the pivot arm is configured to move in the first direction when the actuator moves in the first direction, thereby causing the pivot arm to pivot about the pivot point such that the second end of the pivot arm moves in a second direction opposite to the first direction, thereby causing the pull arm to move in the second direction, wherein movement of the pull arm in the second direction causes the locking piece to move to the second position and out of contact with said latch lip, thereby allowing free rotation of the semicircular latch member about said pivot pin to the open position;
   wherein said semicircular latch member is received through a leash ring to loosely restrain said leash ring when in said closed position, and wherein said leash ring is freely separable from said semicircular latch member when said semicircular latch member is in said open position such that no portion of said latching device remains with said leash ring after separation from the semicircular latch member.

2. The device of claim 1, further comprising a device housing.

3. The device of claim 1, wherein the locking piece is a slideable locking piece rigidly connected to the pull arm.

4. The device of claim 1, wherein the solenoid and the semicircular latch member are positioned at a same end of the device.

5. The device of claim 1, wherein the solenoid and the semicircular latch member are positioned at opposite ends of the device.

6. The device of claim 1, wherein a movement in the first direction is movement toward the semicircular latch member and a movement in the second direction is movement away from the semicircular latch member.

7. The device of claim 1, wherein the device is configured to restrain the leash ring when the semicircular latch member is in the closed position and the locking piece is in the first position.

8. The device of claim 1, further comprising a strap configured to secure the device to a fixed surface.

9. The device of claim 1, further comprising a power source configured to transmit the electrical signal to the solenoid.

10. The device of claim 9, wherein the power source comprises a battery.

11. The device of claim 10, wherein the power source is configured to receive a signal from a remote control instructing the power source to transmit the electrical signal to the solenoid.

* * * * *